US008279305B2

(12) United States Patent
Jung et al.

(10) Patent No.: US 8,279,305 B2
(45) Date of Patent: Oct. 2, 2012

(54) PHOTOGRAPHING METHOD AND APPARATUS FOR PHOTOGRAPHING A PLURALITY OF TIMES USING A PLURALITY OF METERING MODES

(75) Inventors: Jae-hyo Jung, Suwon-si (KR);
Hyun-seok Kim, Suwon-si (KR);
Young-soo Bok, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 196 days.

(21) Appl. No.: 12/688,000

(22) Filed: Jan. 15, 2010

(65) Prior Publication Data

US 2010/0201842 A1    Aug. 12, 2010

(30) Foreign Application Priority Data

Feb. 11, 2009  (KR) .................. 10-2009-0011220

(51) Int. Cl.
*H04N 5/235* (2006.01)
(52) U.S. Cl. ..................... 348/229.1; 348/362
(58) Field of Classification Search ............... None
See application file for complete search history.

(56) References Cited

U.S. PATENT DOCUMENTS

| 7,092,024 B2* | 8/2006 | Kawamura et al. ...... 348/333.12 |
| 7,453,506 B2* | 11/2008 | Li .......................... 348/333.12 |
| 2006/0038894 A1* | 2/2006 | Chan et al. ................ 348/222.1 |
| 2006/0158532 A1* | 7/2006 | Ayaki et al. .............. 348/229.1 |

FOREIGN PATENT DOCUMENTS

| JP | 11-007053 A | 1/1999 |
| KR | 1020070044257 A | 4/2007 |
| KR | 1020070053288 A | 5/2007 |

* cited by examiner

*Primary Examiner* — Luong T Nguyen
(74) *Attorney, Agent, or Firm* — Drinker Biddle & Reath LLP (57) ABSTRACT

A photographing apparatus may include an image pickup device which captures an image and converts the captured image into an electric image signal. A luminance detector may calculate a plurality of luminance evaluation values corresponding to a plurality of metering modes using light measurement areas of the image of the electric image signal. The light measurement areas corresponding to each of the plurality of metering modes may be different from each other. An exposure value calculator may calculate an automatic exposure value based on the luminance evaluation value corresponding to each of the plurality of metering modes. The apparatus may also include a photographing controller which performs photographing in a plurality of times corresponding to the metering modes by operating the image pickup device using the automatic exposure values to capture a plurality of photographed images. A display unit may display the plurality of photographed images.

20 Claims, 9 Drawing Sheets

PHOTOGRAPHING METHOD AND APPARATUS FOR PHOTOGRAPHING A PLURALITY OF TIMES USING A PLURALITY OF METERING MODES

CROSS-REFERENCE TO RELATED PATENT APPLICATION

This application claims the priority benefit of Korean Patent Application No. 10-2009-0011220, filed on Feb. 11, 2009, in the Korean Intellectual Property Office, the disclosure of which is incorporated herein in its entirety by reference.

BACKGROUND

1. Field of the Invention

The present invention relates to a photographing method and apparatus, and more particularly, to a photographing method and apparatus wherein photographing is performed a plurality of times by using a plurality of metering modes.

2. Description of the Related Art

Photographing apparatuses, including digital cameras, typically convert light reflected from a subject into an electric signal, store the electric signal as image data, and process or reproduce the stored image data. In digital cameras, a captured image of a subject may be checked directly without making a print of the captured image as performed in conventional film cameras. The captured image may also be easily edited and processed by using a digital medium. Accordingly, film cameras are quickly being replaced by the digital cameras.

An automatic exposure function, one of various functions of digital cameras, typically automatically controls the light intensity and light exposure time on an image pickup surface by adjusting the openness of an iris and speed of a shutter. According to the automatic exposure function, exposure is typically automatically controlled by considering the light intensity of a subject and surroundings, and the light reflectivity of the subject.

The digital cameras having such an automatic exposure function typically include a metering system that measures the light intensity of an image to be captured based on a predetermined metering mode, and calculates the most suitable exposure value based on the measured light intensity. The metering system typically determines which information of the image will be used to calculate an exposure value and which method is used to calculate the exposure value. Metering modes used by the metering system depend on a photographing apparatus and a manufacturer.

The digital cameras typically include about 3 types of metering modes for the convenience of a user. In these digital cameras, the user may select one of a multi-zone metering mode, a center-weighted metering mode, and a spot metering mode, considering light intensity of a subject and the surroundings.

The multi-zone metering mode typically measures the values of brightness of an entire image, and determines an exposure value corresponding to an average value of the measured brightness values. The spot metering mode typically determines an exposure value based on one point of an image. The center-weighted metering mode typically is generated by considering that a subject is mostly disposed in the center of an image, and determines an exposure value by calculating light intensity such that light intensity of the center of the image is in a range of about 60 to about 80% and light intensity of the surroundings is in a range of about 40 to about 20%.

However, when an image having a large light intensity contrast is to be captured, a captured image may remarkably differ based on which metering mode is used and which part of light of the image is measured. An experienced user may select a metering mode by predicting a result of the photographing, but a general user without experience may obtain a desired image by capturing the image several times by changing a metering mode. In this case, it is inconvenient for the general user to change a metering mode, and an important scene may be missed while changing a metering mode.

SUMMARY

Embodiments include a photographing apparatus and a photographing method wherein a user may conveniently capture an image having a desired optimum exposure.

Embodiments also include a photographing apparatus and a photographing method wherein a user is able to check and select images captured in various metering modes without changing a metering mode.

In an exemplary photographing apparatus and an exemplary photographing method, photographing is performed a plurality of times by calculating a luminance evaluation value and an automatic exposure value corresponding to each of a plurality of metering modes by measuring light exposed to an image to be captured, and a plurality of captured images are displayed.

An exemplary embodiment of a photographing apparatus may include an image pickup device which captures an image and converts the captured image into an electric image signal. The apparatus may also include a luminance detector which calculates a plurality of luminance evaluation values corresponding to a plurality of metering modes using light measurement areas of the image of the electric image signal, wherein the light measurement areas corresponding to each of the plurality of metering modes are different from each other. The apparatus may also include an exposure value calculator which calculates an automatic exposure value based on the luminance evaluation value corresponding to each of the plurality of metering modes. The apparatus may further include a photographing controller which performs photographing in a plurality of times corresponding to the plurality of metering modes by operating the image pickup device using the automatic exposure values to capture a plurality of photographed images. The apparatus may additionally include a display unit which displays the plurality of photographed images that are captured by the image pickup device.

The plurality of metering modes may include a multi-zone metering mode which measures light of an entire area of the image of the electric image signal by dividing the image of the electric image signal into a plurality of light measurement areas. The plurality of metering modes may also include a center-weighted metering mode which measures light of a center light measurement area of the image of the electric image signal. The plurality of metering modes may additionally include a spot metering mode which measures light of a light measurement area including a partial area of the image of the electric image signal.

The photographing apparatus may further include a metering mode setter which sets metering modes, from among the plurality of metering modes, to be used when the photographing controller operates the image pickup device to perform the photographing.

The photographing controller may perform an auto metering bracketing using the metering modes set by the metering mode setter.

The display unit may display the plurality of photographed images one by one on a screen.

The display unit may display the plurality of photographed images simultaneously on a screen by dividing the screen.

The photographing apparatus may further include a user input unit by which a user selects one of the plurality of photographed images, and a memory which stores the photographed image selected by the user.

Another exemplary embodiment of a photographing apparatus may include an image pickup device which photographs a subject and converts image light of the photographed subject into an electric image signal. The apparatus may also include an exposure meter which measures the image light of the subject that is to be photographed by the image pickup device. The apparatus may additionally include a luminance detector which calculates a plurality of luminance evaluation values corresponding to a plurality of metering modes using light measurement areas of the image light of the subject, wherein the light measurement areas corresponding to each of the plurality of metering modes are different from each other. The apparatus may further include an exposure value calculator which calculates an automatic exposure value based on the luminance evaluation value corresponding to each of the plurality of metering modes. The apparatus may also include a photographing controller which performs photographing in a plurality of times corresponding to the plurality of metering modes by operating the image pickup device using the automatic exposure values to capture a plurality of photographed images. The apparatus may additionally include a display unit which displays the plurality of photographed images that are captured by the image pickup device and a user input unit which selects one of the plurality of photographed images by receiving a user input.

The plurality of metering modes may include a multi-zone metering mode which measures light of an entire area of the image light of the subject, a center-weighted metering mode which measures light of a center area of the image light of the subject, and a spot metering mode which measures light of a partial area of the image light of the subject, wherein the exposure meter may perform the measurements of the plurality of metering modes.

An exemplary embodiment of a photographing method may include calculating a luminance evaluation value corresponding to each of a plurality of metering modes by measuring light of an image to be captured in each of the plurality of metering modes, wherein light measurement areas corresponding to the plurality of metering modes are different from each other. The method may also include calculating an automatic exposure value based on the luminance evaluation value corresponding to each of the plurality of metering modes. The method may additionally include performing photographing in a plurality of times corresponding to the plurality of metering modes using the automatic exposure values to capture a plurality of photographed images and displaying the plurality of photographed images that are captured during the performing of the photographing.

The photographing method may further include selecting one of the plurality of photographed images by receiving a user input, and storing the photographed image selected in the selecting of the one of the plurality of photographed images.

The plurality of metering modes may include a multi-zone metering mode which measures light of an entire area of the image to be captured by dividing the image to be captured, a center-weighted metering mode which measures light of a center area of the image to be captured, and a spot metering mode which measures light of a partial area of the image to be captured.

The photographing method may further include setting metering modes, from among the plurality of metering modes, to be used during the performing of the photographing.

The photographing method may also include performing an auto metering bracketing using the set metering modes from among the plurality of metering modes.

In the displaying of the plurality of photographed images, the plurality of photographed images may be displayed one by one on a screen or may be displayed on the screen simultaneously by dividing the screen.

BRIEF DESCRIPTION OF THE DRAWINGS

The above and other features and advantages of the present invention will become more apparent by describing in detail exemplary embodiments thereof with reference to the attached drawings described below.

DETAILED DESCRIPTION

Hereinafter, exemplary embodiments of the present invention will be described more fully with reference to the accompanying drawings, in which exemplary embodiments of the invention are shown.

Figure 1:
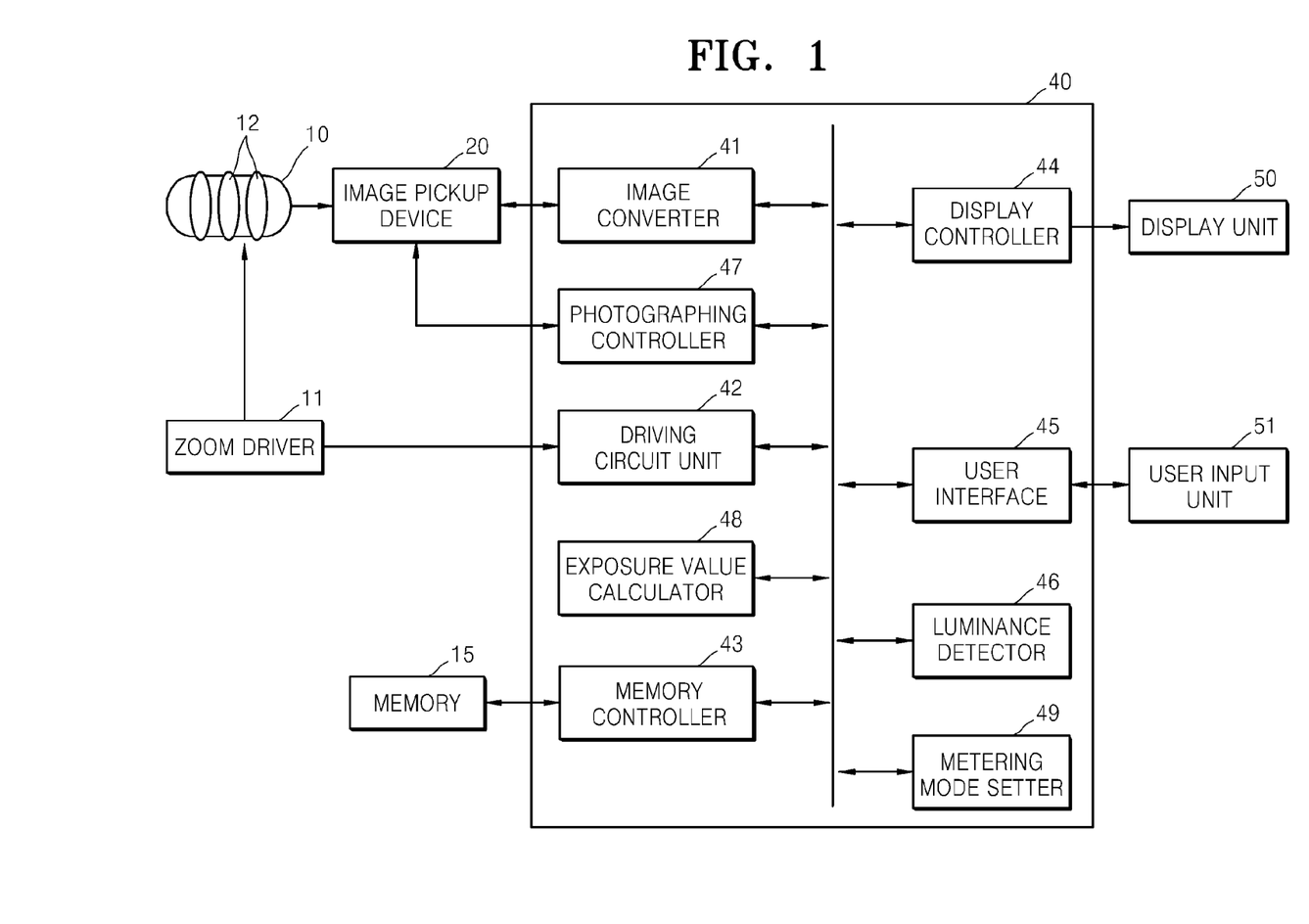
FIG. 1 is a block diagram schematically illustrating elements of an exemplary photographing apparatus.

FIG. 1 is a block diagram schematically illustrating elements of an exemplary photographing apparatus. The photographing apparatus illustrated in FIG. 1 may include an image pickup device 20, a luminance detector 46, an exposure value calculator 48, a photographing controller 47, a display unit 50, and a user input unit 51. The image pickup device 20 may capture an image and convert the captured image into an electric image signal. The luminance detector 46 may calculate a luminance evaluation value of each of a plurality of metering modes. The exposure value calculator 48 may calculate an automatic exposure value of each of the plurality of metering modes. The photographing controller 47 may perform photographing by operating the image pickup device 20.

The display unit 50 may display captured images. The user input unit 51 may receive a user input.

A zoom lens unit 10 disposed in front of the image pickup device 20 may include a plurality of lenses 12 and may form an image according to an external image light on a surface of the image pickup device 20. Distances between the lenses 12 may be changeable. By changing the distances between the lenses 12, a magnifying power of the zoom lens unit 10 may be changed.

The distances between the lenses 12 may be changed by using a zoom driver 11 having a driving means such as a zoom motor. The zoom driver 11 may operate by receiving a control signal from a driving circuit unit 42 of a controller 40. Accordingly, the zoom driver 11 may drive the zoom lens unit 10 to have one of a plurality of magnifying powers.

The image pickup device 20 may include a photoelectric transformation element, such as a charge-coupled device (CCD) or a complementary metal oxide semiconductor (CMOS) device, and may convert image light received via the zoom lens unit 10 into an image signal that includes an electric signal. Processes of converting the image light into the image signal may include detailed processes, such as a process of converting the image light into an analog signal and a process of converting the analog signal into a digital signal.

The controller 40 may be electrically connected to the image pickup device 20, the zoom driver 11, the display unit 50, and the user input unit 51. In order to control operations of each element to which the controller 40 is connected, the controller 40 may transmit and/or receive control signals and/or data to and/or from the elements. The controller 40 may also process data. The controller 40 may include an image converter 41, the driving circuit unit 42, a display controller 44, a user interface 45, a memory controller 43 that controls data storage of a memory 15, the luminance detector 46, the exposure calculator 48, and a metering mode setter 49.

The controller 40 may be realized in a micro chip or a circuit board including a micro chip, and each element included in the controller 40 may be realized in software or circuits embedded in the controller 40.

A display device, such as a liquid crystal display (LCD) or an organic light emitting diode (OLED), may be used as part of the display unit 50.

The memory controller 43 may control recording of image data on the memory 15, and writing and reading of the image data or setting information recorded on the memory 15. The memory 15 may include a semiconductor memory device, such as a synchronous dynamic random access memory (SDRAM), thereby storing data of a captured image. The memory 15 may also include static RAM (SRAM) or flash memory.

The user input unit 51 may receive a user input. The user input unit 51 may include buttons for a menu manipulation, a jog dial, or a receiver for recognizing a touch manipulation disposed on a front surface of the display unit 50. The photographing apparatus may receive a signal of the user input unit 51 via the user interface 45. The user may select one of a plurality of captured images displayed on the display unit 50 via the user input unit 51.

The luminance detector 46 may calculate a luminance evaluation value of each of a plurality of metering modes, wherein light measurement areas in an image indicated by the image signal may be different in each of the metering modes.

The exposure value calculator 48 may calculate an automatic exposure value of each of the metering modes based on the luminance evaluation value calculated by the luminance detector 46.

The photographing controller 47 may perform photographing in a plurality of times by operating the image pickup device 20 using the automatic exposure values calculated by the exposure value calculator 48.

The metering modes include methods of calculating the most suitable exposure value by measuring the light intensity of an image to be captured. A light measurement area used to calculate an exposure value in the image and a method of determining an exposure value differ according to the metering modes.

A type of the metering modes includes a multi-zone metering mode, which measures light of an entire area by dividing an image indicated by an image signal. Another type of the meter modes includes a center-weighted metering mode, which measures light of a center area of the image. An additional type of the meter modes includes a spot metering mode, which measures light of a partial area of the image. However, the type of the metering modes is not limited thereto, and various types of metering modes may be used.

The metering mode setter 49 may predetermine metering modes to be used when the photographing controller 47 operates the image pickup device 20 to perform the photographing. The photographing controller 47 may perform an auto metering bracketing (AMB), which performs photographing corresponding to the entire set of metering modes in the photographing apparatus or performs photographing by using a subset of the metering modes according to setting information of the metering mode setter 49, or may perform photographing by using one of the metering modes.

According to the photographing apparatus described above, the photographing controller 47 may perform the photographing in a plurality of times by calculating the luminance evaluation value and automatic exposure value of each of the metering modes, and display a plurality of captured images. Accordingly, the images that are captured by measuring light in various metering modes via one manipulation may be checked, thereby selecting an optimum captured image.

The display unit 50 may display the plurality of captured images one by one on a screen. For example, an image captured in the multi-zone metering mode may be displayed first, an image captured in the center-weighted metering mode may be displayed after a predetermined time, and an image captured in the spot metering mode may be displayed after another predetermined time. Alternatively, the display unit 50 may display one of the captured images, and then a next captured image may be displayed via user input. The display unit 50 may also display the plurality of captured images at once on the screen by dividing the screen.

Figure 2:
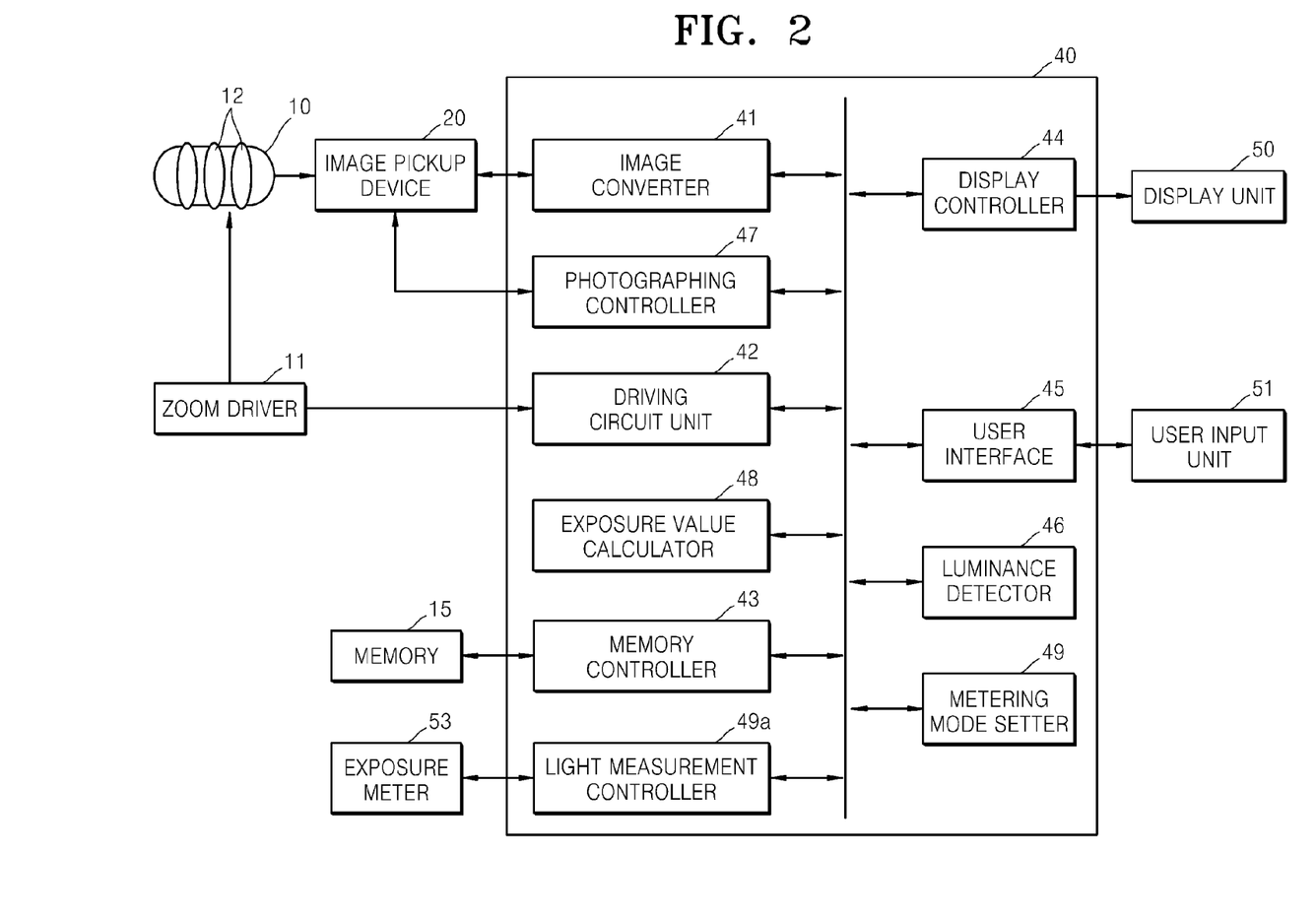
FIG. 2 is a block diagram schematically illustrating elements of another exemplary photographing apparatus.

FIG. 2 is a block diagram schematically illustrating elements of another exemplary photographing apparatus. The photographing apparatus of FIG. 2 is similar to the photographing apparatus of FIG. 1, except for an exposure meter 53, which may measure light of an image to be captured, and a light measurement controller 49a, which is connected to the exposure meter 53 and may control the light measurement.

In the photographing apparatus illustrated in FIG. 2, light of an image to be captured by the image pickup device 20 may be measured using the exposure meter 53. Also, the luminance detector 46 and the exposure value calculator 48 may respectively calculate the luminance evaluation value and the automatic exposure value corresponding to each of the metering modes by using the result of measuring light.

Figure 3:
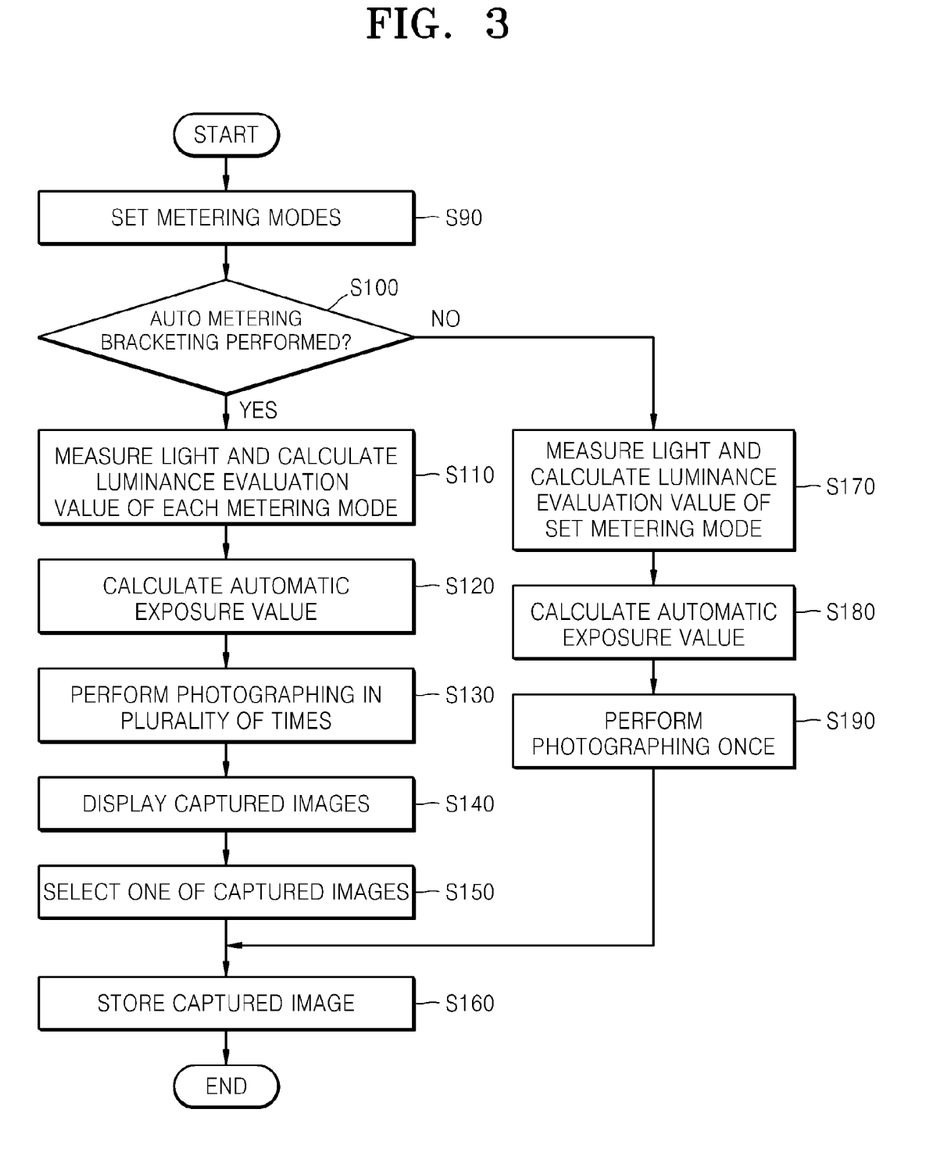
FIG. 3 is a flowchart of an exemplary photographing method.

FIG. 3 is a flowchart of an exemplary photographing method. The exemplary photographing method may begin with setting metering modes that are to be used in an operation S90. According to the metering modes set in operation S90, auto metering bracketing (AMB) that performs photographing using all of the entire set of metering modes in the photographing apparatus or photographing using a portion of the metering modes may be performed. Alternatively, photographing may be performed by using one of the metering modes according to the metering mode set in operation S90. In an operation S100, a determination is made as to whether AMB is to be performed based on the metering modes set in operation S90.

If the determination is made in operation S100 that AMB is to be performed, calculating a luminance evaluation value of each of a plurality of metering modes by measuring light in each of the plurality of metering modes may be performed in an operation S110, calculating an automatic exposure value of each of the metering modes based on the luminance evaluation values may be performed in an operation S120, photographing in a plurality of times in each of the metering modes may be performed in an operation S130, displaying captured images may be performed in an operation S140, and selecting one of the captured images may be performed in an operation S150. A captured image may be stored in the operation S160.

The photographing method may be performed when a user manipulates a photographing apparatus once, for example, when the user presses a shutter button. Alternatively, the photographing method may be performed when the user manipulates the photographing apparatus twice, for example, when the user half-presses the shutter button and then completely presses the shutter button. Here, operations S110 and S120 may be performed when the shutter button is half-pressed, and operations S130, S140, and S150 may be performed when the shutter button is completely pressed.

A type of the metering modes includes a multi-zone metering mode, which measures light of an entire area by dividing an image indicated by an image signal, a center-weighted metering mode, which measures light of a center area of the image, and a spot metering mode, which measures light of a partial area of the image. However, the type of the metering modes is not limited thereto, and various types of metering modes may be used.

If the determination is made in operation S100 that the AMB is not performed based on operation S90, one of the metering modes in the photographing apparatus may be performed. Accordingly, light measuring and calculation of a luminance evaluation value of an image to be captured in the set metering mode may be performed in an operation S170. An automatic exposure value may be calculated based on the luminance evaluation value in an operation S180. Then, photographing may be performed once in an operation S190 based on the calculated automatic exposure value. A captured image may be stored in the operation S160.

Hereinafter, operations S110 through S160, which may be performed if the determination is made that the AMB is performed in operation S100, will be described.

Figure 4:
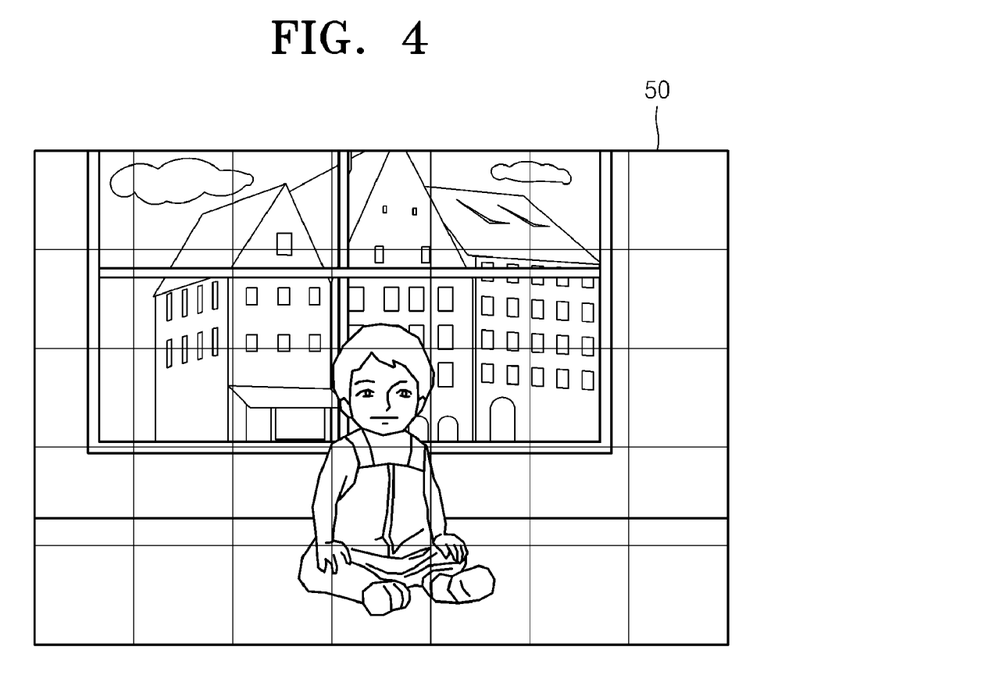
FIG. 4 is a diagram illustrating a light measurement area in a first metering mode in a photographing example according to the exemplary photographing method of FIG. 3.

FIG. 4 is a diagram illustrating a light measurement area in a first metering mode in a photographing example according to the exemplary photographing method of FIG. 3. The first metering mode is a multi-zone metering mode which may measure light of an entire area of an image to be captured, by dividing the image. The image displayed on the display unit 50 of FIG. 4 may be divided into a plurality of areas, in which light is to be measured, in the multi-zone metering mode.

In operation S110, the luminance evaluation value may be calculated by measuring light of the entire area of the image by using an image pickup device or an exposure meter. In operation S120, the automatic exposure value of the first metering mode may be calculated based on the luminance evaluation value.

Figure 5:
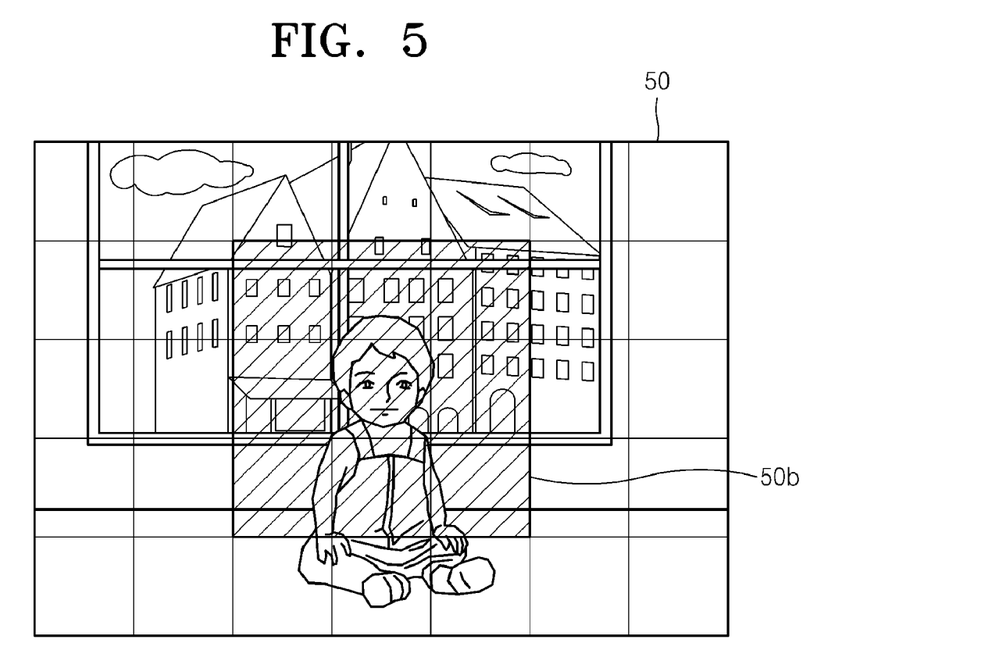
FIG. 5 is a diagram illustrating a light measurement area in a second metering mode in a photographing example according to the exemplary photographing method of FIG. 3.

FIG. 5 is a diagram illustrating a light measurement area in a second metering mode in a photographing example according to the exemplary photographing method of FIG. 3. The second metering mode is a center-weighted metering mode which may measure light of a center area of an image to be captured. In the image displayed on the display unit 50 of FIG. 5, light of an area 50b may be measured in the center-weighted metering mode.

In operation S110, the luminance evaluation value may be calculated by measuring light of the area 50b of the image by using an image pickup device or a exposure meter. In operation S120, the automatic exposure value of the second metering mode may be calculated based on the luminance evaluation value.

Figure 6:
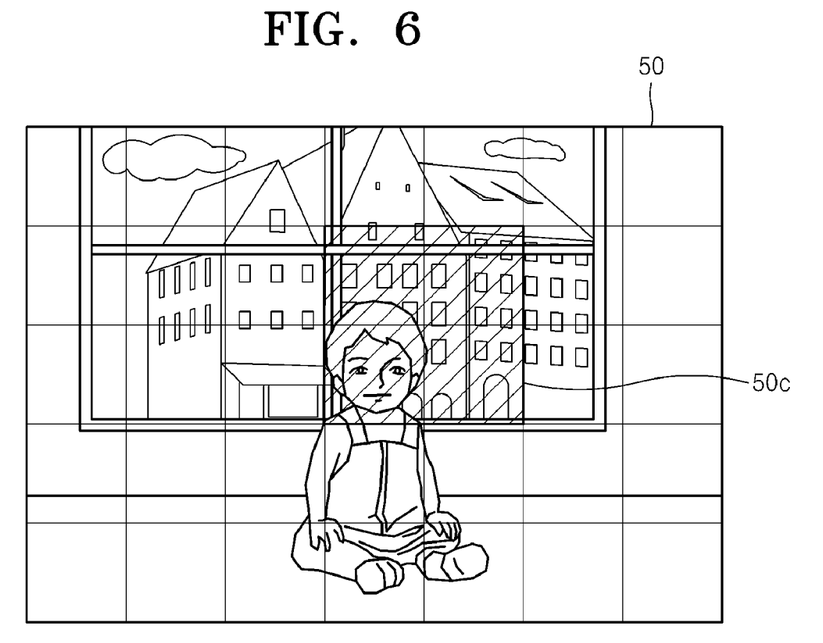
FIG. 6 is a diagram illustrating a light measurement area in a third metering mode in a photographing example according to the exemplary photographing method of FIG. 3.

FIG. 6 is a diagram illustrating a light measurement area in a third metering mode in a photographing example according to the exemplary photographing method of FIG. 3. The third metering mode is a spot metering mode that may measure light of a partial area of an image to be captured. In the image displayed on the display unit 50 of FIG. 6, light of an area 50c may be measured in the spot metering mode.

In operation S110, the luminance evaluation value may be calculated by measuring light of the area 50c of the image by using an image pickup device or a exposure meter. In operation S120, the automatic exposure value of the third metering mode may be calculated based on the luminance evaluation value.

When the luminance evaluation values and the automatic exposure values of each metering mode are calculated after operations S110 and S120, photographing may be performed in a plurality of times according to each metering mode in operation S130.

A plurality of captured images obtained in operation S130 may be displayed on the display unit 50 in operation S140. A user may check the captured images and select one of the captured images to be stored in operation S150.

Figure 7:
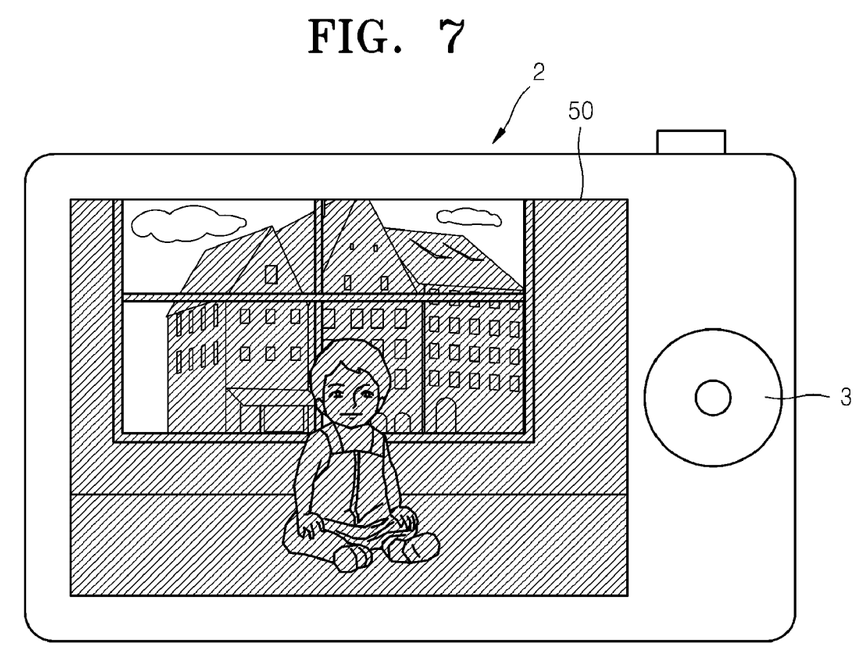
FIG. 7 is an exemplary captured image in the first metering mode in the photographing example of FIG. 4.
Figure 8:
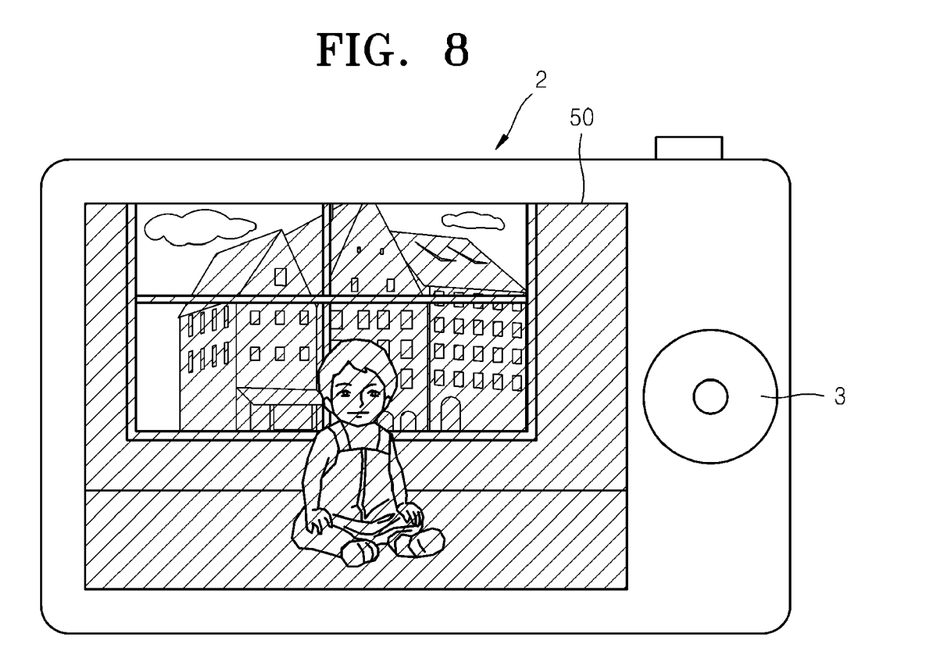
FIG. 8 is an exemplary captured image in the second metering mode in the photographing example of FIG. 5.
Figure 9:
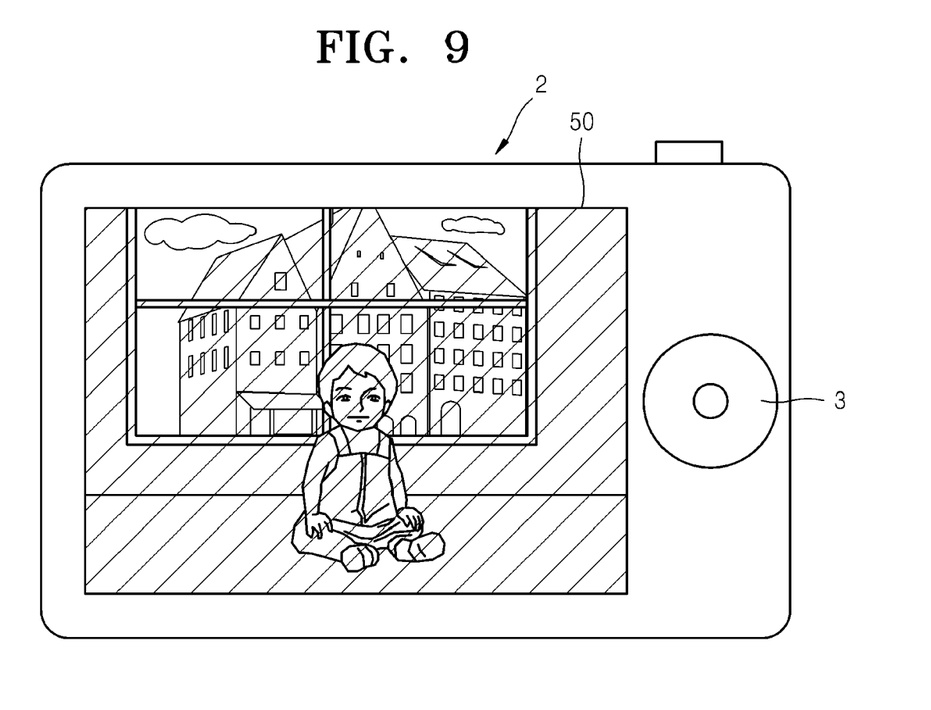
FIG. 9 is an exemplary captured image in the third metering mode in the photographing example of FIG. 6.

FIG. 7 is an exemplary captured image in the first metering mode in the photographing example of FIG. 4, FIG. 8 is an exemplary captured image in the second metering mode in the photographing example of FIG. 5, and FIG. 9 is an exemplary captured image in the third metering mode in the photographing example of FIG. 6.

When a plurality of captured images are displayed on a display unit 50 of a photographing apparatus 2, the captured images may be displayed one by one on a screen as shown in FIGS. 7 through 9. For example, the captured image of the multi-zone metering mode may be displayed first, and then the captured images of the center-weighted metering mode and the spot metering mode may each be displayed after a predetermined time interval. Alternatively, one of the captured images may be displayed on the display unit 50, and a next captured image may be displayed when a user manipulates a manipulation button 3.

Figure 10:
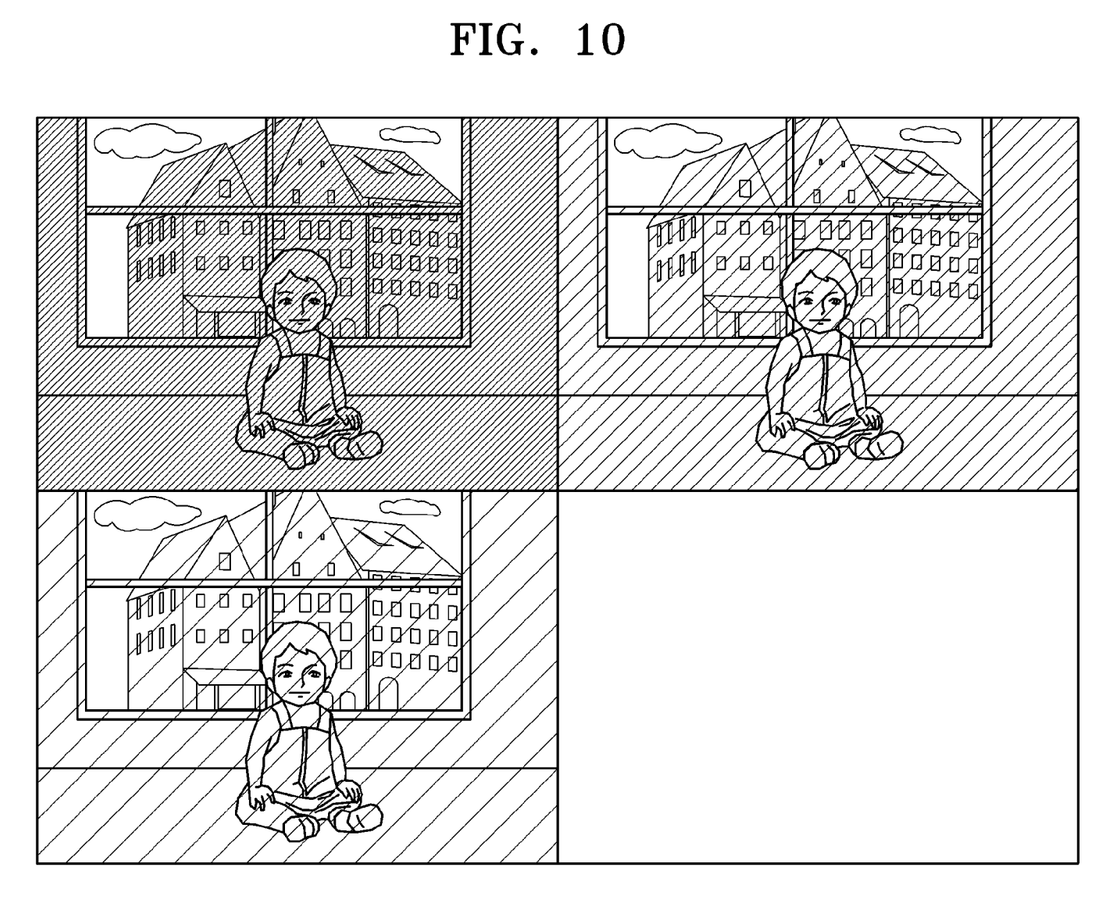
FIG. 10 is a diagram illustrating a modified example of displaying captured images on a screen in operation S140 of the exemplary photographing method of FIG. 3.

FIG. 10 is a diagram illustrating a modified example of displaying captured images on a screen in operation S140 of the exemplary photographing method of FIG. 3. When a plurality of captured images are displayed in operation S140, the captured images may be displayed at once on a screen by dividing the screen as shown in FIG. 10. A user may check the captured images simultaneously displayed on the screen, and may select one of the captured images.

In operation S150, one of the captured images may be selected via a user input received when a user manipulates a user input unit 51, such as the manipulation button 3 of FIGS. 7-9. The captured image selected in operation S150 may be stored in a storage device such as a memory in operation S160.

According to the photographing method above, the photographing may be performed a plurality of times by calculating the luminance evaluation values and the automatic exposure values of each of the plurality of metering modes by measuring light of the image to be captured, and a plurality of captured images may be displayed. Accordingly, the captured images taken by measuring light in various metering modes with one user input may be checked, such that an optimum captured image may thereby be selected.

Figure 11A:
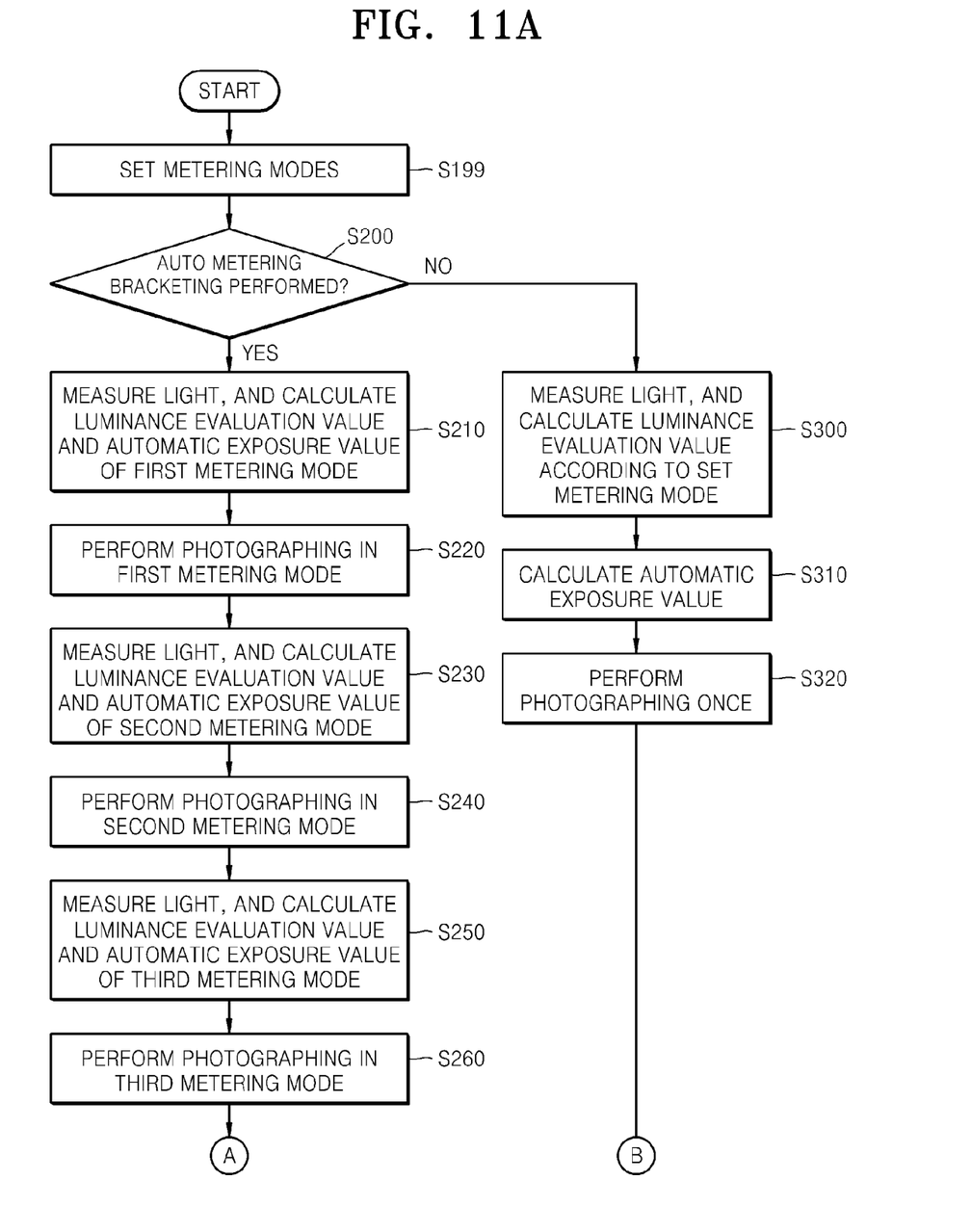
FIGS. 11A and 11B illustrate a flowchart of another exemplary photographing method.
Figure 11B:
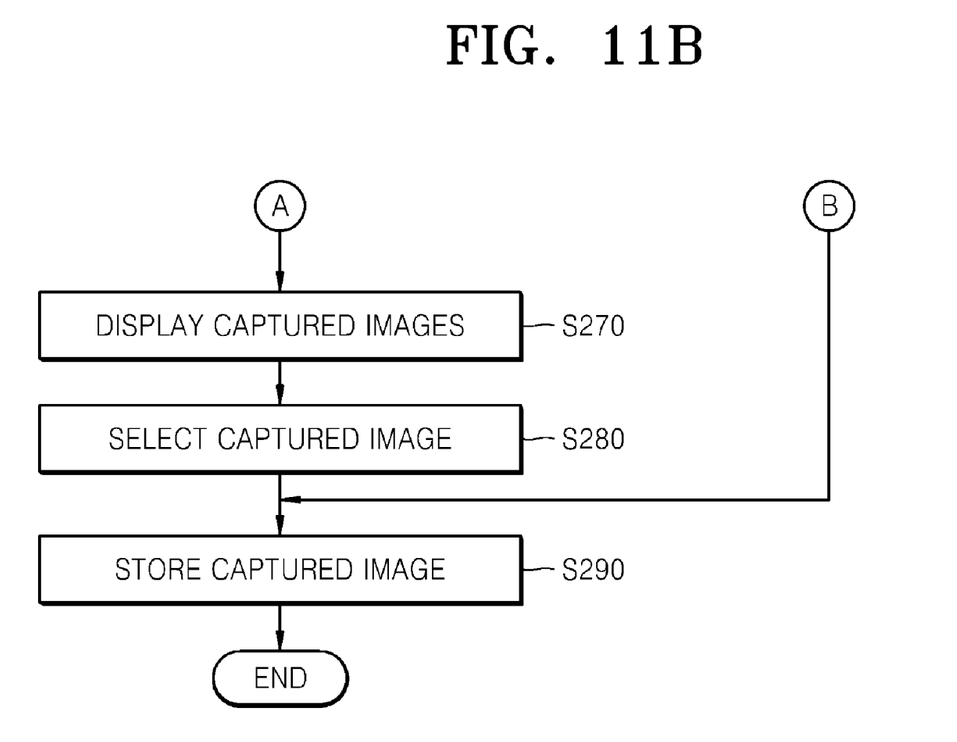

FIGS. 11A and 11B illustrate a flowchart of another exemplary photographing method. The photographing method of FIGS. 11A and 11B is similar to the photographing method of FIG. 3, except that light measurement, luminance evaluation value calculation, automatic exposure value calculation, and photographing may be sequentially performed according to each metering mode in the photographing method of FIGS. 11A and 11B, whereas the photographing according to each metering mode may be performed at once in the photographing method of FIG. 3.

The photographing method of FIGS. 11A and 11B includes calculating luminance evaluation values of each metering mode by measuring light in each metering mode, and calculating automatic exposure values based on the luminance evaluation values (operations S210, S230, and S250), performing photographing in a plurality of times in each metering mode (operations S220, S240, and S260), displaying captured images (operation S270), and selecting one of the captured images (operation S280).

The exemplary photographing method may begin with setting metering modes that are to be used in an operation S199. These metering modes may be used in operations S220, S240, and S260, as described below. According to the metering modes set in operation S199, AMB that performs photographing corresponding to the entire set of metering modes in the photographing apparatus or photographing using a portion of the metering modes may be performed in operations S210 through S280 as described below. Alternatively, photographing may be performed by using one of the metering modes in operations S300 through S320 as described below. In an operation S200, a determination is made as to whether AMB is to be performed based on the metering modes set in operation S199.

If the determination is made in operation S200 that AMB is to be performed, light may be measured and a luminance evaluation value and an automatic exposure value may be calculated according to a first metering mode in operation an S210. Then photographing may be performed in the first metering mode based on the calculated automatic exposure value in an operation S220.

Then, light may be measured and a luminance evaluation value and an automatic exposure value may be calculated according to a second metering mode and a third metering mode in operations S230 and S250, respectfully. Additionally, photographing may be performed in each of the second and the third metering modes based on the calculated automatic exposure values in operations S240 and S260, respectively.

In operation S270, a plurality of captured images obtained in operations S220, S240, and S260 may be displayed on a display unit. In operation S280, the user may check the captured images displayed on the display unit, and select one captured image to be stored. The photographing method may further include storing of the selected captured image in an operation S290.

If the determination is made in operation S200 that the AMB is not performed, one of the metering modes in the photographing apparatus may be performed. In this case, light measuring and calculation of a luminance evaluation value of an image to be captured in the set metering mode may be performed in an operation S300. An automatic exposure value may be calculated based on the luminance evaluation value in an operation S310. Then, photographing may be performed once in an operation S320 based on the calculated automatic exposure value. A captured image may then be stored in operation S290.

The photographing method may be performed when a user manipulates a photographing apparatus once, for example, when a user presses a shutter button. Alternatively, the photographing method may be performed when the user manipulates the photographing apparatus twice, for example, when the user half-presses the shutter button, and then completely presses the shutter button. In the latter case, operations S210, S230, and S250 may be performed when the shutter button is half-pressed, and operations S220, S240, S260, S270, and S280 may be performed when the shutter button is completely pressed.

According to the exemplary photographing method of FIGS. 11A and 11B, the luminance evaluation values and the automatic exposure values may be calculated and photographing may be performed according to each of the metering modes by measuring light of an image to be captured, and the plurality of captured images may be displayed. Accordingly, the images that are captured by measuring light in various metering modes via one user manipulation may be checked, such that an optimum captured image may thereby be selected.

According to the photographing apparatus and the photographing method described above, luminance evaluation values and automatic exposure values of a plurality of metering modes may be calculated by measuring light of an image to be captured, photographing may be performed in a plurality of times based on the automatic exposure values, and a plurality of captured images may be displayed. Accordingly, photographing may be conveniently performed with optimum exposure as desired by a user. Consequently, the captured images in various metering modes can be checked and selected without the user performing photographing several times while changing a metering mode.

A program for executing a method of photographing using the photographing apparatus according to the aforementioned embodiments or modifications thereof may be stored in a computer-readable storage medium. Examples of the storage medium include magnetic storage media (e.g., floppy disks or hard disks), optical recording media (e.g., CD-ROMs or digital versatile disks (DVDs)), and electronic storage media (e.g., integrated circuits (IC's), ROM, RAM, or flash memory).

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. It will be recognized that the terms "comprising," "including," and "having," as used herein, are specifically intended to be read as open-ended terms of art.

What is claimed is:

1. A photographing apparatus comprising:
   an image pickup device which captures an image and converts the captured image into an electric image signal;
   a luminance detector which calculates a plurality of luminance evaluation values corresponding to a plurality of metering modes using light measurement areas of the image of the electric image signal, wherein the light measurement areas corresponding to each of the plurality of metering modes are different from each other;
   an exposure value calculator which calculates an automatic exposure value based on the luminance evaluation value corresponding to each of the plurality of metering modes;
   a photographing controller which performs photographing in a plurality of times corresponding to the plurality of metering modes by operating the image pickup device using the automatic exposure values to capture a plurality of photographed images; and
   a display unit which displays the plurality of photographed images that are captured by the image pickup device.

2. The photographing apparatus of claim 1, wherein the plurality of metering modes comprises:
   a multi-zone metering mode which measures light of an entire area of the image of the electric image signal by dividing the image of the electric image signal into a plurality of light measurement areas;
   a center-weighted metering mode which measures light of a center light measurement area of the image of the electric image signal; and
   a spot metering mode which measures light of a light measurement area including a partial area of the image of the electric image signal.

3. The photographing apparatus of claim 1, further comprising a metering mode setter which sets metering modes, from among the plurality of metering modes, to be used when the photographing controller operates the image pickup device to perform the photographing.

4. The photographing apparatus of claim 3, wherein the photographing controller performs an auto metering bracketing using the metering modes set by the metering mode setter.

5. The photographing apparatus of claim 1, wherein the display unit displays the plurality of photographed images one by one on a screen.

6. The photographing apparatus of claim 1, wherein the display unit displays the plurality of photographed images simultaneously on a screen by dividing the screen.

7. The photographing apparatus of claim 1, further comprising:
   a user input unit by which a user selects one of the plurality of photographed images; and
   a memory which stores the photographed image selected by the user.

8. A photographing apparatus comprising:
   an image pickup device which photographs a subject and converts image light of the photographed subject into an electric image signal;
   an exposure meter which measures the image light of the subject that is to be photographed by the image pickup device;
   a luminance detector which calculates a plurality of luminance evaluation values corresponding to a plurality of metering modes using light measurement areas of the image light of the subject, wherein the light measurement areas corresponding to each of the plurality of metering modes are different from each other;
   an exposure value calculator which calculates an automatic exposure value based on the luminance evaluation value corresponding to each of the plurality of metering modes;
   a photographing controller which performs photographing in a plurality of times corresponding to the plurality of metering modes by operating the image pickup device using the automatic exposure values to capture a plurality of photographed images;
   a display unit which displays the plurality of photographed images that are captured by the image pickup device; and
   a user input unit which selects one of the plurality of photographed images by receiving a user input.

9. The photographing apparatus of claim 8, wherein the plurality of metering modes comprises:
   a multi-zone metering mode which measures light of an entire area of the image light of the subject;
   a center-weighted metering mode which measures light of a center area of the image light of the subject; and
   a spot metering mode which measures light of a partial area of the image light of the subject,
   wherein the exposure meter performs the measurements of the plurality of metering modes.

10. The photographing apparatus of claim 8, further comprising a metering mode setter which sets metering modes, from among the plurality of metering modes, to be used when the photographing controller operates the image pickup device to perform the photographing.

11. The photographing apparatus of claim 10, wherein the photographing controller performs an auto metering bracketing using the metering modes set by the metering mode setter.

12. The photographing apparatus of claim 8, wherein the display unit displays the plurality of photographed images one by one on a screen.

13. The photographing apparatus of claim 8, wherein the display unit displays the plurality of photographed images simultaneously on a screen by dividing the screen.

14. A photographing method comprising:
   calculating a luminance evaluation value corresponding to each of a plurality of metering modes by measuring light of an image to be captured in each of the plurality of metering modes, wherein light measurement areas corresponding to the plurality of metering modes are different from each other;
   calculating an automatic exposure value based on the luminance evaluation value corresponding to each of the plurality of metering modes;
   performing photographing in a plurality of times corresponding to the plurality of metering modes using the automatic exposure values to capture a plurality of photographed images; and
   displaying the plurality of photographed images that are captured during the performing of the photographing.

15. The photographing method of claim 14, further comprising:
   selecting one of the plurality of photographed images by receiving a user input; and
   storing the photographed image selected in the selecting of the one of the plurality of photographed images.

16. The photographing method of claim 14, wherein the plurality of metering modes comprises:
   a multi-zone metering mode which measures light of an entire area of the image to be captured by dividing the image to be captured;
   a center-weighted metering mode which measures light of a center area of the image to be captured; and a spot metering mode which measures light of a partial area of the image to be captured.

17. The photographing method of claim 14, further comprising setting metering modes, from among the plurality of metering modes, to be used during the performing of the photographing.

18. The photographing method of claim 17, wherein the photographing comprises performing an auto metering bracketing using the set metering modes from among the plurality of metering modes.

19. The photographing method of claim 14, wherein in the displaying of the plurality of photographed images, the plurality of photographed images are displayed one by one on a screen.

20. The photographing method of claim 14, wherein in the displaying of the plurality of photographed images, the plurality of photographed images are displayed on a screen simultaneously by dividing the screen.

* * * * *